United States Patent [19]

Yoshimura et al.

[11] 4,108,823
[45] Aug. 22, 1978

[54] COMPOSITION FOR COMPENSATING INSUFFICIENT ADAPTATION OF DENTURE BASE

[75] Inventors: Masakiyo Yoshimura; Yasukazu Yamaguti, both of Osaka, Japan

[73] Assignees: Shionogi & Co., Ltd.; Kabushiki Kaisha Kyowa, both of Japan

[21] Appl. No.: 860,957

[22] Filed: Dec. 15, 1977

[30] Foreign Application Priority Data

Dec. 18, 1976 [JP] Japan .............................. 51-152618

[51] Int. Cl.$^2$ .............................................. C08K 5/05
[52] U.S. Cl. ............................... 260/33.4 PQ; 32/2; 106/35
[58] Field of Search .................. 260/33.4 R, 33.4 PQ, 260/897 B; 106/35; 32/2

[56] References Cited

U.S. PATENT DOCUMENTS

| | | | |
|---|---|---|---|
| 3,575,915 | 4/1971 | Novak | 260/33.4 R |
| 3,740,361 | 6/1973 | Altwirth | 106/35 |

*Primary Examiner*—Paul R. Michl
*Attorney, Agent, or Firm*—Birch, Stewart, Kolasch and Birch

[57] ABSTRACT

A composition for compensating the insufficient adaptation of a denture base to the ridges on the jaws or the palate, which comprises polyvinyl acetate, polybutene and ethanol in a weight proportion of 65 – 85 : 2 – 7 : 10 – 35 and which fills up the spaces between the denture base and the ridges and alleviates various defects caused by an insufficient adaptation.

2 Claims, No Drawings

COMPOSITION FOR COMPENSATING INSUFFICIENT ADAPTATION OF DENTURE BASE

The present invention relates to a composition for compensating the insufficient adaptation of a denture base to the ridges on the jaws or the palate.

In general, the adaptation of a denture base to the ridges on the jaws or the palate is gradually lowered with the lapse of time from its preparation due to the variation or change in the oral cavity. Particularly, a space may be produced between the jaw bank and the denture base to cause a satisfactory adaptation to be lost, whereby various disadvantages such as occurrence of unsteadiness, impossibility of complete occlusion inconvenience in speaking, difficulty in eating, etc. are caused. Further, a large occlusion pressure may be given onto the teethridges on eating, whereby an acute pain or injury is sometimes produced. While the insufficient adaptation should be, in substance, improved by a specialist such as a dentist, the improvement of a denture base requires a considerably long time and a large economic burden. Thus, patients being troubled with such an insufficient adaptation are obliged, in practice, to be in distress until the improvement of the denture base is completed.

As a provisional or temporary measure for alleviation of the distress of such patients until the denture base is improved by a specialist, it has been proposed to fill up the spaces between the denture base and the ridges on the jaws or the palate with any composition not harmful to human bodies. A typical example of such compositions (so-called "denture stabilizer(s)") as practically used is a paste composition comprising gum arabic as the base material. This paste composition is, however, not convenient in requiring its application every day. Further, its elasticity is insufficient so that the kinds of foods to be taken by patients are considerably restricted. Another typical example is an elastic composition comprising a polyacrylic ester, and polyvinyl acetate or polyvinyl chloride incorporated with a low molecular weight plasticizer (e.g. phthalic esters) in a proportion of 10 to 65% by weight based on the total weight of the said polymers [cf. Japanese Patent Publication (examined) No. 20101/1966]. However, the plasticizer used in this elastic composition is not sufficiently harmless to human beings, and its practical and frequent application is questionable.

The so-called "denture stabilizer" is in essence required in view of its use, to have an appropriate fluidity upon application but to solidify rapidly after the application to change into a formed product having a suitable elasticity. At the same time, it is practically important that the denture stabilizer be substantially nontoxic to human bodies. The resins which have been used for conventional denture stabilizers acquire a desirable elasticity only with difficulty unless a low molecular weight plasticizer is incorporated therein, while the harmlessness of such plasticizers human bodies is presently not assured.

As the result of an extensive study, it has now been found that a composition comprising as the essential components polyvinyl acetate, polybutene and ethanol in a certain specific proportion is quite useful as a denture stabilizer. Each of the essential components is recognized as a quite safe material to human beings and has been permitted for use as a food additive. This is a great advantage of the above composition in view of its use in the oral cavity.

According to the present invention, there is provided a composition for compensating the insufficient adaptation of a denture base to the ridges on the jaws or the palate, which comprises polyvinyl acetate, polybutene and ethanol in a weight proportion of 65 – 85 : 2 – 7 : 10 – 35.

As the polyvinyl acetate, the one having a degree of polymerization of about 350 to 5000 is preferable. It is not necessarily required to use only one kind of the polymer, and two or more kinds of polymers having different polymerization degrees may be used in combination in a suitable proportion. The polybutene to be used in the invention may be a liquid one having an average molecular weight of about 500 to 2500. Such polybutene is known and obtainable, for instance, by polymerizing one or more kinds of butenes such as n-butylene and isobutylene in a conventional manner. The commercially available polybutene which is a copolymer of n-butylene and isobutylene and has an average molecular weight of about 1300 may be employed advantageously.

The mixing proportion of polyvinyl acetate, polybutene and ethanol is required to be in the said range as mentioned above. When the amount of the polyvinyl acetate is smaller than the lower limit, the solidification will be insufficient. When it is larger than the upper limit, the elasticity will be reduced. In the case of the amount of the polybutene being smaller than the lower limit, the elasticity is insufficient. In the case of its amount being larger than the upper limit, a uniform composition is hardly obtainable. With an amount of ethanol smaller than the lower limit, the fluidity is insufficient so that the handling and application of the composition become difficult, and the solidification can not proceed easily. With its amount being larger than the upper limit, a strong stimulus to the oral cavity is produced at the fixation of the denture and a sufficient hardness which is endurable against the occlusion pressure is scarcely obtained.

In addition to the said essential components, the composition of the invention may contain as optional components a coloring agent, a flavoring agent, a taste-reforming agent, an odor-reforming agent, etc. in appropriate amounts insofar as the desired effect is not substantially reduced.

The preparation of the composition may be effected by kneading a mixture of the said essential components and, if necessary, the optional components at room temperature or under heating or cooling, usually at a temperature of from about 5° to 80° C. The objective composition is obtainable as a semi-transparent, semi-fluid substance.

Since the thus obtained composition possesses an appropriate consistency or visco-elasticity (usually from about 170 to 240 in the penetration when measured by the use of a penetrometer manufactured by Mitamura Riken Seisakusho K.K. having a needle portion of 92 mm in length and 4 mm in diameter, symmetrically tapered at one end to a cone of 7 mm in length, and a weight portion of 130 mm in length with a needle load of 73.5 g and a penetration time of 5 seconds at a measuring temperature of 25° ± 3° C), its application onto the denture base can be effected with ease. After the application, the denture base onto which the composition has been applied is treated with water to dissolve out the ethanol, whereby a white film having a sufficient elasticity is formed on the surface of the composition layer. Frequently, the composition in the inner part of the composition layer remains as a semi-fluid material, which may serve as a cushion giving a softness. Instead of treatment with water, the denture base onto which the composition has been applied may be immediately adapted in the oral cavity, i.e. to the ridges on the jaws or the palate, so that the ethanol is dissolved out into the saliva and a white film having a satisfactory elasticity is formed as above.

The present invention will be hereinafter explained further in details by the following Examples wherein percentage (%) is by weight.

EXAMPLE 1

A mixture of 45% of polyvinyl acetate (content of remaining monomers, less than 1.0%; average degree of polymerization, 450), 20% of polyvinyl acetate (content of remaining monomers, less than 1.0%; average degree of polymerization, 4500), 5% of polybutene ("HV 300" manufactured by Nisseki Chemical Co., Ltd.; number average molecular weight (determined by vapor pressure osmometer), 1300) and 30% of ethanol (purity, 99%) is stirred at a temperature of 50° to 80° C to make a uniform semi-fluid composition, which is charged into a tube.

A denture is washed with water, and the base portion to be contacted with the teethridge is dried. From the said tube, the composition is pushed out and applied to the base portion of the denture to be contacted with the teethridge so as to form a layer having a thickness of about 1 mm. After being allowed to stand still for 2 to 3 minutes, the denture is fixed in the oral cavity and chewed well under a force which is uniform on both sides. Then, the denture is taken out and washed with water at the base portion. After the excess of the composition layer as softened is cut off, the denture is again fixed in the oral cavity.

By this treatment, a patient who has been troubled with an insufficient adaptation of the denture base recovers complete occlusion.

EXAMPLE 2

A mixture of 70% of polyvinyl acetate (content of remaining monomers, less than 1.0%; average degree of polymerization, 2500), 4% of polybutene as in Example 1 and 26% of absolute ethanol is stirred at a temperature of 50 to 80° C to make a uniform semi-fluid composition, which is charged into a tube.

In the same manner as in Example 1, the composition can be used for assurance of a satisfactory adaptation of a denture base in the oral cavity.

EXAMPLE 3

A mixture of 30% of polyvinyl acetate (content of remaining monomers, less than 1.0%; average degree of polymerization, 500), 25% of polyvinyl acetate (content of remaining monomers, less than 1.0%; average degree of polymerization, 1800), 20% of polyvinyl acetate (content of remaining monomers, less than 1.0%; average degree of polymerization, 3500), 3.5% of polybutene as in Example 1 and 21.5% of absolute ethanol is stirred at a temperature of 50° to 80° C to make a uniform semi-fluid composition, which is charged into a tube.

In the same manner as in Example 1, the composition can be used for assurance of a satisfactory adaptation of a denture base in the oral cavity.

What is claimed is:

1. A composition for compensating the insufficient adaptation of a denture base to the ridges on the jaws or the palate, which comprises polyvinyl acetate, polybutene and ethanol in a weight proportion of 65 - 85 : 2 - 7 : 10 - 35.

2. A method for compensating the insufficient adaptation of a denture base to the ridges on the jaws or the palate, which comprises filling up the spaces between the denture base and the ridges with the composition according to claim 1.

* * * * *